US010334507B2

(12) United States Patent
Hassan et al.

(10) Patent No.: US 10,334,507 B2
(45) Date of Patent: Jun. 25, 2019

(54) OPPORTUNISTIC USE OF SPECTRUM

(71) Applicant: Microsoft Technology Licensing, LLC, Redmond, WA (US)

(72) Inventors: Amer Hassan, Kirkland, WA (US); Mark Clear, Snohomish, WA (US); Paul Mitchell, Seattle, WA (US); Paul Garnett, Fremont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 22 days.

(21) Appl. No.: 14/829,977

(22) Filed: Aug. 19, 2015

(65) Prior Publication Data

US 2017/0055200 A1 Feb. 23, 2017

(51) Int. Cl.
| *H04W 16/14* | (2009.01) |
| *H04W 4/021* | (2018.01) |
| *H04W 48/08* | (2009.01) |
| *H04W 48/14* | (2009.01) |
| *H04W 64/00* | (2009.01) |

(Continued)

(52) U.S. Cl.
CPC .......... *H04W 48/14* (2013.01); *H04W 4/021* (2013.01); *H04W 48/08* (2013.01); *H04W 72/0453* (2013.01); *H04W 16/14* (2013.01); *H04W 64/00* (2013.01); *H04W 84/12* (2013.01)

(58) Field of Classification Search
CPC . H04W 16/14; H04W 48/16; H04W 72/0453; H04L 63/101
See application file for complete search history.

(56) References Cited

U.S. PATENT DOCUMENTS

| 7,457,620 B2 | 11/2008 | Lam et al. |
| 7,636,336 B2 | 12/2009 | Forte et al. |
| 8,179,797 B2 | 5/2012 | Chandra et al. |

(Continued)

FOREIGN PATENT DOCUMENTS

WO 2009095832 A1 8/2009

OTHER PUBLICATIONS

"International Search Report and Written Opinion Issued in PCT Application No. PCT/US2016/043796", dated Oct. 7, 2016, 14 Pages.

(Continued)

*Primary Examiner* — Dung Hong
(74) *Attorney, Agent, or Firm* — NovoTechIP International PLLC (57) ABSTRACT

Opportunistic use of spectrum is disclosed that allows a device access to a wireless local area network (WLAN) when necessary on a restricted frequency band and provides efficient scanning and switching of device communications to an unrestricted frequency band when channels become available in the unrestricted frequency band. A device operating in the network on the restricted frequency band may receive information on a channel set over a channel in the restricted frequency band. The channel set may be a subset of channels in the network and indicate network channels available for potential use in the unrestricted frequency band. The device may then only scan the subset of channels in the channel set to search for available channels in the unrestricted band. The channel set may be determined by the network based on the operation of the device in the coverage of the restricted frequency band.

19 Claims, 7 Drawing Sheets

(51) Int. Cl.
*H04W 72/04* (2009.01)
*H04W 84/12* (2009.01)

(56) References Cited

U.S. PATENT DOCUMENTS

| | | | |
|---|---|---|---|
| 8,185,129 B2 | 5/2012 | Alizadeh-Shabdiz | |
| 8,547,862 B2 | 10/2013 | Bahl et al. | |
| 8,588,158 B2 | 11/2013 | Kim et al. | |
| 8,695,063 B2 | 4/2014 | Kholaif et al. | |
| 8,879,573 B2 | 11/2014 | Bahl et al. | |
| 2005/0025181 A1 | 2/2005 | Nazari | |
| 2005/0063334 A1 | 3/2005 | Fnu et al. | |
| 2009/0061783 A1 | 3/2009 | Choi et al. | |
| 2011/0222488 A1* | 9/2011 | Kim | H04W 72/0426 370/329 |
| 2011/0314208 A1 | 12/2011 | Feinberg et al. | |
| 2012/0039284 A1* | 2/2012 | Barbieri | H04W 48/10 370/329 |
| 2012/0094681 A1 | 4/2012 | Freda et al. | |
| 2012/0134328 A1 | 5/2012 | Gauvreau et al. | |
| 2012/0170534 A1* | 7/2012 | Kim | H04H 20/42 370/329 |
| 2013/0045759 A1* | 2/2013 | Smith | H04W 4/029 455/456.6 |
| 2013/0077554 A1 | 3/2013 | Gauvreau et al. | |
| 2013/0165134 A1 | 6/2013 | Touag et al. | |
| 2013/0215757 A1 | 8/2013 | Vandwalle et al. | |
| 2013/0223357 A1* | 8/2013 | Jones | H04L 27/0006 370/329 |
| 2014/0029585 A1 | 1/2014 | Freda et al. | |
| 2014/0038657 A1 | 2/2014 | Jo et al. | |
| 2014/0066061 A1* | 3/2014 | Lou | H04W 48/16 455/434 |
| 2014/0080535 A1* | 3/2014 | Gauvreau | H04W 16/14 455/513 |
| 2014/0274089 A1 | 9/2014 | Hassan et al. | |
| 2014/0286326 A1 | 9/2014 | Jang et al. | |
| 2015/0063168 A1* | 3/2015 | Hwang | H04W 48/16 370/254 |
| 2015/0133091 A1* | 5/2015 | Baldwin | H04W 4/16 455/414.1 |
| 2015/0263837 A1* | 9/2015 | Patel | H04L 27/0006 370/329 |
| 2016/0183247 A1* | 6/2016 | Syed | H04B 7/212 370/337 |

OTHER PUBLICATIONS

Alcatel-Lucent, et al., "Channel Selection for Licensed-Assisted Access", In Proceedings of 3GPP TSG, vol. RAN WG1 Meeting ID #78BIS, Report No. R1-144082, Oct. 6, 2014, 4 Pages.

"UE Power Saving by Network Assistance", In Proceedings of 3GPP TSG Meeting, vol. RAN WG2, Meeting ID #82, Report No. R2-131861, May 20, 2013, 4 Pages.

"International Preliminary Report on Patentability Issued in PCT Application No. PCT/US2016/043796", dated Mar. 6, 2017, 8 Pages.

"Spectrum Bridge", Published on: Sep. 25, 2011 Available at: http://whitespaces.spectrumbridge.com/Overview/Home.aspx.

Huang, et al., "Opportunistic Spectrum Access in Cognitive Radio Networks", In Proceedings of IEEE 27th on Conference Computer Communications, Apr. 13, 2008, pp. 2101-2109.

* cited by examiner

OPPORTUNISTIC USE OF SPECTRUM

BACKGROUND

Because of the growth of wireless communications, efforts have been made to increase the amount of wireless spectrum permitted to be used by networks such as wireless local area networks (WLANs). WLANs typically use spectrum in the unlicensed 2.4 GHz Industrial Services and Medical (ISM) band and the 5 GHz Unlicensed National Information Infrastructure (UNII) band. For example, in the United States the Federal Communications Commission (FCC) has permitted unlicensed systems to use portions of wireless spectrum that is licensed to television broadcasters. This licensed spectrum is known as the television white space band (TVWS) and is located in the very high frequency (VHF) and ultra-high frequency (UHF) bands. Wireless networks, such as WLANs, may benefit from the long range propagation and building penetration properties of VHF and UHF bands compared to the unlicensed spectrum bands. However, while use of the unlicensed bands is unrestricted for unlicensed devices, use of the licensed bands for unlicensed devices is subject to restrictions. For example, unlicensed devices may transmit in the TVWS only as long as they do not interfere with the licensed users of the TVWS spectrum such as television broadcasters and licensed wireless microphones.

Because of the requirements that use of restricted bands be noninterfering with other users, restricted band channels should generally only be used when necessary and not be used when other acceptable unrestricted band channels are available. Adherence to these requirements means that a wireless network that utilizes both restricted and unrestricted frequency bands is an environment where associations and re-associations occur on different channels with access points of the network on a frequent and regular basis. For example, a device using TVWS channels in a WLAN should check for availability of, for example, 2.4 GHz or 5 GHz channels in between sessions and change channels when available channels are found.

Channel scanning is generally performed by a device when the device wishes to associate with (e.g., become part of or join) a wireless network, switch channels in a wireless network or when a device wishes to re-associate with a network. The time it takes for a device to perform channel scanning, which may be up to two or more seconds, may be fairly significant in a wireless-networking environment where associations and re-associations occur frequently. Channel scanning also consumes resources of a device, requiring increased processing and power capability.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus that provide efficient opportunistic use of spectrum in a wireless network are disclosed herein. The disclosed embodiments provide channel scanning that reduces the amount of scanning performed when opportunistically using spectrum.

In an embodiment, opportunistic use of spectrum allows a device access to a network when necessary on a first frequency band, that may be restricted as to how it may be used, and provides efficient scanning and switching of device communications to a second frequency band, which may unrestricted for use, when channels become available in the second frequency band. A device operating according to embodiments of the disclosure may access the network on a channel in a restricted band when in an area in which only channels in the restricted band provide coverage or when unrestricted band channels are otherwise unavailable. A device operating in the network on the restricted frequency band may receive information over a channel in the restricted frequency band about network channels for potential use in the unrestricted frequency band. The device may only scan the channels associated with the received information to search for available channels in the unrestricted band. The received information may include a list indicating a set of potential unrestricted channels that is determined based on the operation of the device in the coverage are of the restricted frequency band of the current network access point. For example, the received information may be determined based on location information of the device or channel information determined at access points proximate to the current access point. The channels in the list may include a reduced set or subset of unrestricted network channels having the highest potential for successful device access of the network in the unrestricted band. The device may perform only active channel scanning of the set of channels on the list so that the device may move to the unrestricted band as soon as acceptable channels in the unrestricted band are found. In alternative implementations the device may still perform passive scanning but on a reduced set of channels that are in the list of the set of channels sent to the device. The device may scan the subset of the channels prior to communication with the network on any channel in the unrestricted frequency band.

It may be determined if the criteria for a channel's inclusion in the list is met based on, for example, information associated with the operation of the device on the restricted band channel in a coverage area of the current access point with which the device is communicating. The determination for a particular channel's inclusion in the list may also be based on the location of the access point using that particular channel. For example, the information associated with the operation of the device in the current access point's restricted band coverage area may include location information of the device provided to, or determined by, the network. The network may determine a list of a set of unrestricted frequency band channels of network access points that are within a predetermined distance, or an area of proximity, of the device. The network may send the list of the set of channels to the device on a channel in the restricted band from the current access point. The device may only scan those channels of the subset of network channels on the list. The set may be a null set having no channels, in which case the device may not perform any scanning. An updated list may be received from the network at the device as the device moves within the coverage area of the restricted band. When the scan of the subset of the channels locates an available channel in the unrestricted frequency band, the device may switch to communicating with the network on the channel in the unrestricted frequency band.

Example embodiments may be implemented within a network by creating and maintaining a database that includes a mapping of the locations of network access points within the coverage area of the network and a database that includes information associated with the channels of the access points. The database may be configured within network infrastructure entities, for example, at a server or at one or more access points. The database may be accessed as necessary by a server, access point, or other network entity, that is determining a list of a set of channels in an unrestricted frequency band for sending to a device operating in the restricted frequency band. Changing conditions in the network may be accounted for by updating the database as necessary.

DETAILED DESCRIPTION

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus that provide opportunistic spectrum use in a wireless network. The embodiments provide efficient opportunistic spectrum use with reduced set channel scanning for use in a device operating in a restricted frequency band. The reduced set scanning may be used to trigger switching of device communications from a channel in the restricted frequency band to a channel in an unrestricted frequency band. Embodiments of the disclosure may be utilized, for example, in the case where a wireless network provides service over an extended coverage area by using restricted band channels when permitted. The restricted band channels may be used when unrestricted band channels of the network do not provide coverage for a device in the extended coverage area and when the restricted band channels are available.

A device may access the network over restricted band channels when necessary and scan/switch quickly and efficiently to unrestricted band channels that may become available to the device. This minimizes or reduces potential conflicts such as the causing of interference or channel congestion in the restricted band. As the device operates in the network, a list of a set of channels in the unrestricted frequency band may be sent to the device over a channel in the restricted band. The channels in the list may include a subset of network channels having the highest potential for successful device access of the network in the unrestricted band. The device need only scan the channels in the list in a reduced set scan to attempt to find a channel in the unrestricted frequency band. Scanning only the subset of channels reduces time spent by a device in scanning. Additionally, since the subset of best potential channels is known to the device, the device may perform only an active channel scan on channels in the list, which further reduces scanning time. For example, the device need not perform a full passive and active scanning on the full channel set of the network, which would be necessary without knowledge of the channel set. In another embodiment, the device may still perform passive scans but only on a reduced number of channels that are in the list of the set of channels sent to the device.

As used in this disclosure restricted band, or restricted frequency band, includes spectrum that is opportunistically used by a network. For example, a restricted frequency band may be a band on which certain users have priority of use over other users. The other users may be permitted to use the restricted band subject to a restriction that causes the network to minimize use of the spectrum. The restricted frequency band is opportunistically used. The restricted frequency band may be a frequency band licensed to service providers for uses other than communications in the wireless network in which the device operates. The restriction on use may require interference with the service providers to be minimized. The restricted band may include, for example, spectrum in the television white space (TVWS). TVWS is licensed for priority use to television broadcasters but other users, such as wireless local area network (WLAN) users, may use TVWS spectrum on the condition that no interference is caused to television broadcasts.

Unrestricted band, or unrestricted frequency band, includes any spectrum that is permitted to be used for the wireless network and is not included in the network's opportunistically used restricted band. The unrestricted frequency band may be an unlicensed frequency band on which the network operates. For example, the unrestricted band may include spectrum in the 2.4 GHz Industrial Services and Medical (ISM) band and the 5 GHz Unlicensed National Information Infrastructure (UNII) band.

In one embodiment, dynamic frequency switching (DFS) channels in the 5 MHz UNII-2 or UNII-2 extended bands may be used the same as unrestricted channels by the network. For example, when licensed TVWS channels are opportunistically used in a network, DFS channels may be treated as unrestricted channels in the 5 MHz band. In an alternative embodiment, DFS channels in the 5 MHz UNII-2 or UNII-2 extended bands may be used as restricted channels and opportunistically used by the network according to embodiments of the disclosure.

Active scanning as used in this disclosure includes scanning performed when a device sets a transceiver to the channel being scanned, broadcasts a probe request, and then waits to hear any probe responses, or periodic beacons, from access points (APs) on that channel with an identifier matching an identifier included in the probe. In example implementations, the probe request frames used in an active scan may be a directed probe where the device sends a probe request with a specific destination network name or Service Set Identifier (SSID). Only APs with a matching SSID reply with a probe response to a directed probe. The probe request frames also may be a broadcast probe in which the client sends a broadcast SSID (also known as a null SSID) in the probe request. All APs receiving the probe request respond with a probe-response for each SSID they support. In active scanning, a device may wait up to 10 ms. for a probe response sent on a channel. Passive scanning is performed by a device setting its transceiver to the channel being scanned and waiting for a periodic beacon from any APs on that channel. APs typically send beacons every 100 ms. During scanning a device may not transmit or receive data.

Because it may take 100 ms. to hear a periodic beacon broadcast, active scanning is preferred over passive scanning. Use of the embodiments reduces the need for both passive and active scanning. The amount of passive scanning is reduced because a device receives a channel set list from the network and may send active scanning probe requests to a reduced set of channels in the frequency band. This removes the need to passively scan any network channels. The amount of active scanning is reduced because a device may direct probe requests only to the reduced set of channels in the channel set list rather than to all network channels. This reduction in scanning may be fairly significant in a wireless-networking environment in which association and re-association with a network may occur frequently. In an implementation, the list of channels may be a null set that does not include any channels. In the case of the null set, the device performs no scan. Wasteful scanning by the device is avoided since no potential channels are available and a scan would not produce results. Operation of the device according to the embodiments also reduces scanning that consumes resources of the device such as processing and battery capability. This increases battery life and allows processing capability of the device to be used more efficiently for other applications. Reducing scanning also provides more time for the device to spend in transmission and reception of data. The reduced amount of scanning may also result in less overall network interference caused by active probe requests.

Figure 1A:
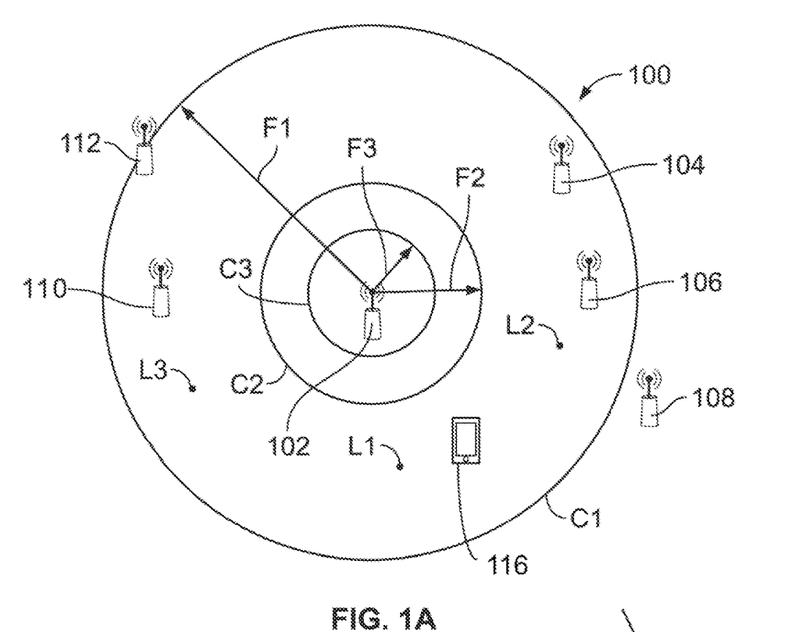
FIG. 1A is a simplified diagram showing example coverage areas of an access point in a wireless network according to an embodiment of the disclosure.

Referring now to FIG. 1A, therein is a simplified diagram showing example coverage areas of an access point in a wireless local area network (WLAN) in which embodiments of the disclosure are implemented. Network 100 is shown as including representative access points (APs) 102-112. Network 100 may include more or less APs than are shown in FIG. 1A. FIG. 1A shows AP 102 having a first coverage area defined by border C1 within which channels of AP 102 in frequency band F1 may be used to communicate with mobile device 116. Frequency band F1 may comprise spectrum in a band to which network 100 is only allowed restricted use such as, for example, TVWS spectrum. AP 102 may also have a second coverage area defined by border C2 within which channels of AP 102 in frequency band F2 may be used to communicate with a mobile device, and a third frequency coverage area defined by border C3 within which channels of AP 102 in frequency band F3 may be used to communicate with a mobile device. Frequency bands F2 and F3 may comprise spectrum in an unrestricted frequency band. For example, frequency band F2 may comprise spectrum in the unlicensed 2.4 GHz ISM band and F3 may comprise spectrum in the unlicensed 5.0 GHz UNII band. The coverage areas shown in FIG. 1A are not drawn to scale, but generally represent the relative coverage areas that may be provided by the example frequency bands. Each of the other access points 104-112 may have similar coverage area patterns in relation to their location and provide channels in one or more of the F1-F3 frequency bands.

In one example embodiment, not every AP in network 100 would provide licensed or restricted frequency band coverage. For example, only APs located on the edge of the network's area would provide the restricted band coverage to form an extended coverage area on the outside edges of network 100. APs located in the inner area of network 100, where there would be better coverage from more APs, would only provide unrestricted frequency band coverage. One or more of the coverage areas of the individual access points 102 112 may have portions that overlap in certain areas. The example of FIG. 1A shows coverage area C1 having greater coverage range and area in the region around access point 102 than do coverage areas C2 or C3. While device 116 is operating in the area between borders C2 and C3, the device 116 is out of range of unrestricted band coverage in frequency bands F2 or F3 for access point 102. For example, device 116 may be located near the location labelled L1 and only obtain restricted band coverage on band F1 for network access. This out of range situation is an example in which the embodiments may be utilized to provide efficient scanning and frequency band switching for opportunistic use of spectrum in devices operating in network 100.

Figure 1B:
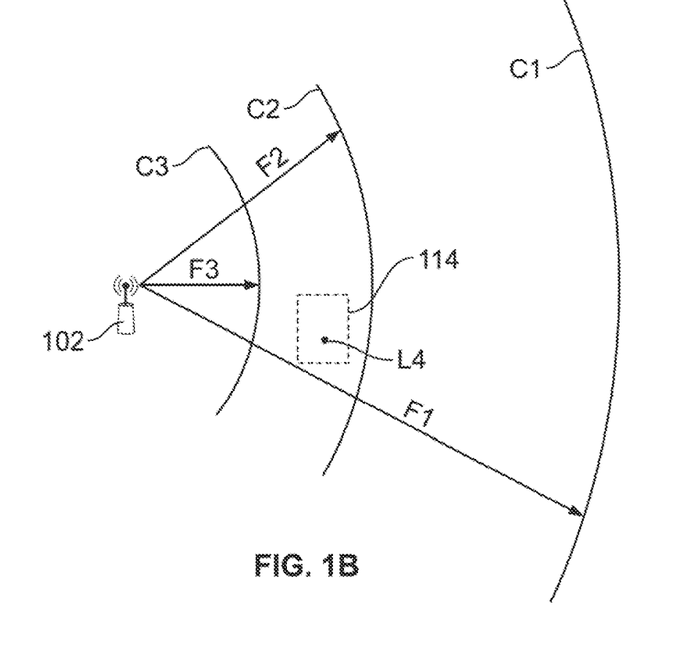
FIG. 1B is a simplified diagram showing a more detailed view of the example coverage area of FIG. 1A.

While the coverage areas of AP 102 are shown in FIG. 1A as roughly circular, the actual shape of the borders C1, C2 and C3 may vary depending on the environment and the configuration of the access point. For example, conditions for radio wave propagation and objects or terrain within the environment may affect the coverage areas. Referring now to FIG. 1B, therein is a simplified diagram showing a more detailed view of the example coverage areas of FIG. 1A. FIG. 1B shows an area that, even though it is within the border C2, is a blind spot 114 for frequency band F2. The area is a blind spot 114 within the network in which, while seemingly within the coverage area of frequency band F2 of access point 102, a device cannot receive or transmit signals to access point 102 in the F2 band. The blind spot may be caused by some type of obstruction such as a natural or manmade structure. For example, the blind spot 114 may be located in a spot in an urban environment or within a building or parking garage where walls or other structures block channels in frequency band F2 at 2.4 GHz. However, device 116 may be able to communicate with AP 102 in licensed frequency band F1 when device 116 is in blind spot 114 if the longer wavelength channels in frequency band F1 at UHF/VHF frequencies are able to penetrate the blocking structures. This type of blind spot situation is another example in which the embodiments may be utilized to provide efficient scanning and frequency band switching for opportunistic use of spectrum in devices operating in network 100.

In the embodiments, as device 116 is operating on restricted frequency band F1 and moves within coverage area C1 of FIG. 1A, a channel set list of channels in the unrestricted frequency band F2 or F3 is sent to the device 116 from AP 102. The channels in the channel set list may vary based on changes in location of device 116. For example, while at location L1, the device 116 may receive a null set because it is determined that there is no potential coverage on frequency bands F2 and F3. If device 116 moves to location L2, the channel set received may be a set of unrestricted channels from the closest access points, 106 and 108, to L2. For example, it may be determined that there is potential coverage at L2 on frequency bands F2 and F3 from AP 106 and potential coverage on frequency band F2 from AP 108. If device 116 moves to location L3, the channel set may be a set of unrestricted channels from the closest access point 110 to L3. In each of the locations L1, L2 and L3, the device 116 avoids unnecessary scanning of the whole network channel set by scanning only the channels in the channel set list corresponding to the operation of device 116 in the coverage area of restricted frequency band F1.

Referring again to FIG. 1B, if device 116 moves into blind spot 114 while operating on a channel in the restricted frequency band of the network 100 or if device 116 is powered up at location L4 within blind spot 114, device 116 may initiate communications on a channel in the restricted frequency band. The channel set sent to device 116 in the blind spot 114 may take into account previous knowledge existing in the network about blind spot 114. For example, based on knowledge that device 116 is at L4 within blind spot 114, the network may configure a channel set list of the best potential channels of access points 102-110 in the unrestricted frequency band and send the channel set list to device 116. In one implementation the channel set list may be null until device 116 leaves the blind spot 114. Depending on movement of device 116, within or out of blind spot 114, the device 116 may then find a channel from the received channel set list or an updated channel set list.

Network 100 may be implemented as a private business network, a commercial/retail establishment network, or any other type of wireless network, and may include indoor and/or outdoor coverage areas. In an example implementation, network 100 may operate according to IEEE 802.11 standards specifications. For example, network 100 may include access points 102-112 that each include transceivers operable according to one or more of the 802.11a (5 GHz), 802.11b (2.4 GHz), 802.11g (2.4 GHz), 802.11n (2.4/5 GHz), 802.11 (5 GHz), or 802.11af (54-698 MHz (TVWS)) standards. The access points may be capable of communicating on channels of various bandwidths within the frequency ranges according to the standard being used for the communications. In other implementations, the network may provide unrestricted and restricted band service according to any other suitable air interface specification.

In an example implementation, wireless devices, such as device 116, may be operable to communicate with the network access points 102-112 according to one or more of the IEE 802.11 standards specifications on which the access points operate. The wireless devices may each also be configured to support opportunistic spectrum use reduced scanning and switching functions according to embodiments of the disclosure. Also, while device 116 is shown as implemented as an example smart phone, the wireless devices may include any type of device that may be configured with functionality supporting the embodiments disclosed herein. Example wireless devices may include a tablet computer, a desktop computer, a laptop computer, gaming devices, media devices, smart televisions, home theater systems, smart automobile systems, smart house systems, multimedia cable/television boxes, smart phone accessory devices, tablet accessory devices, personal digital assistants (PDAs), portable media players, fitness/medical devices, smart watches, or industrial control systems.

Figure 2:
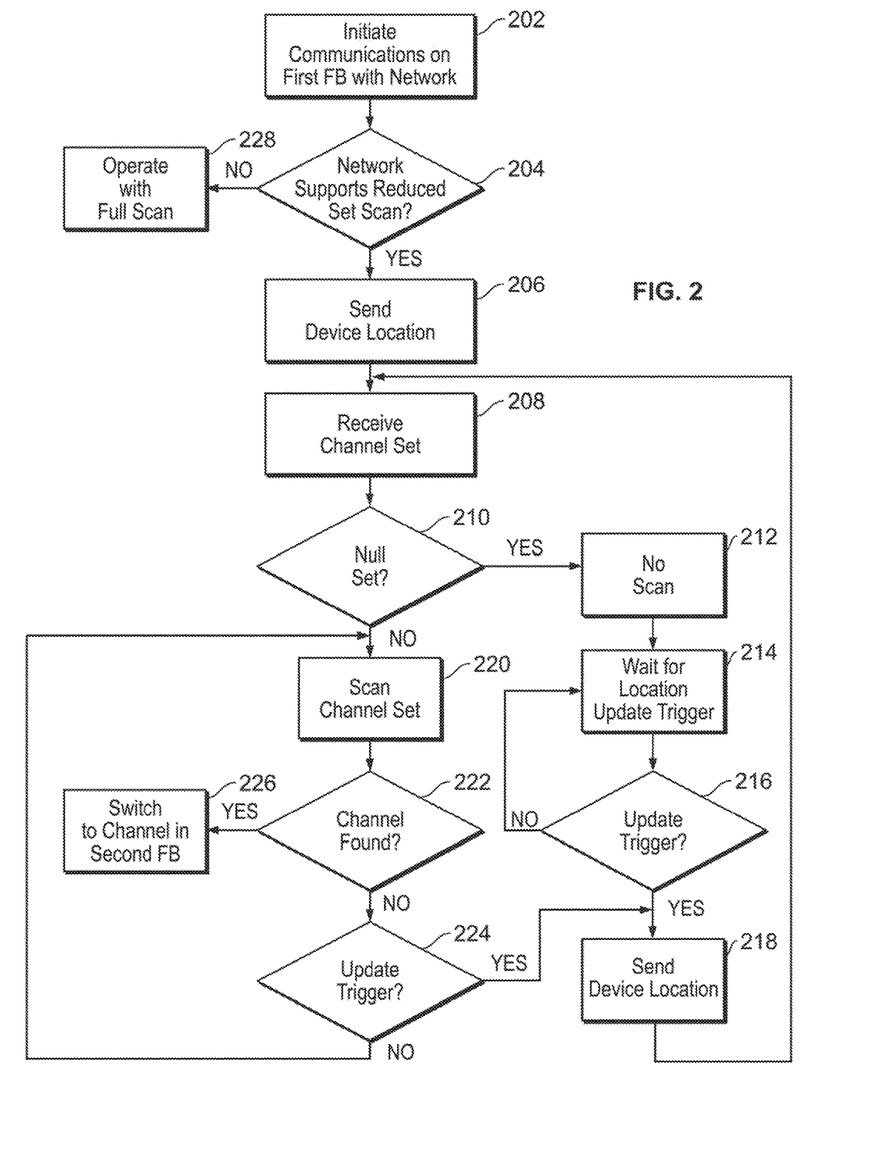
FIG. 2 is a flow diagram illustrating operations performed in an example device according to an embodiment of the disclosure.

Referring now to FIG. 2, therein is a flow diagram illustrating operations performed in an example device according to an embodiment of the disclosure. FIG. 2 may be explained with reference to FIGS. 1A and 1B and device 116. In an example implementation the restricted frequency band F1 channels may be configured according to the air interface specified by the 802.11af standard for the licensed TVWS spectrum. The unrestricted frequency band F2 and/or F3 channels may be configured according to the air interface specified by one or more of the 802.11 standards for the unlicensed 2.4 GHz and 5 GHz spectrums.

At 202, device 116 initiates communication with access point 102 of network 100 on the restricted frequency band F1 (First FB). This initiation of communications may be performed when device 116 is located in the portion of coverage area C1 that is non-overlapping with the coverages areas C2 and C3, and, also non-overlapping with F2 and F3 band coverage areas of the other access points 104-112. In this example the only available channels located by device 116 are in the restricted frequency band F1. For example, device 116 may be located at the position indicated by L1 in FIG. 1A when communications are first initiated on a channel in the restricted frequency band.

At 204 a determination may be made at device 116 as to whether or not network 100 supports reduced set scanning. This may be performed by exchanging capability information between device 116 and access point 102 using information elements in the channel in the restricted frequency band. If it is determined that reduced set scanning is not supported the device exits the process at 228 and operates using normal full scan procedures. If it is determined that the network supports reduced set scanning the process moves to 206.

At 206, device 116 sends its location L1 to access point 102. In an implementation, the location may be sent as a set of global positioning satellite (GPS) coordinates that are derived at device 116.

At 208, device 116 receives a channel set list from access point 102. The channel set list may be received in an information element (IE) on the channel in the restricted frequency band F1. For example, an IE reserved as a vendor specific or proprietary IE may be utilized. The channel set list may be determined in network 100 by using the GPS location data of device 116 sent in 206. The channel set list may include channels on one or more unrestricted frequency bands depending on the configuration of access points in a network 100. For example, in the implementation of FIG. 1A the channel set list may include only channels of unrestricted frequency band F2 or may include channels for both unrestricted frequency bands F2 and F3. The inclusion of channels in the channel set list depends on which unrestricted channels are determined by the network 100 to be best suited for potential use by device 116 based on its location relative to each of the network access points 102-112.

At 210 the device determines whether the channel set list is a null set. If the channel set list does not include any channels, and a null list or a null set indication has been received, the process moves to 212 and no channel scan is performed by device 116. If the channel set is not a null set, the process moves to 220. Use of the null set indication allows device 116 to avoid unnecessary scanning when the network has determined that device 116 at location L1 is too far out of range to practically find acceptable network channels in unrestricted frequency bands F2 or F3.

If the channel set list was determined to be a null set and no scan was performed, from 212 the process moves to 214 where device 116 waits for a location update trigger. Device 116 may check on a predetermined basis at 216 to determine if an update trigger has occurred. A location trigger update may be any way of triggering device 116 to send its current location to access point 102. For example, a timer may be set in device 116 that triggers sending of updated location data on a predetermined time basis. Alternately, network 100 may send location update requests to device 116 on a predetermined basis based on a timer in network 100 or based on other criteria to trigger an update. In an implementation, the sending of current location data from device 116 may be triggered when device 116 has determined it has moved beyond a predetermined distance from its last sent location. Combinations of triggering criteria may also be used. The location update trigger criteria may be implemented by the network operator or device owner to reduce unnecessary scanning. If, at 216, no update trigger is received, the process moves back to 214 and waits for the trigger update. When it is determined at 216 that there has been an update trigger, updated device location data is sent from device 116 to the access point 102 at 218 and the process move back to 208.

However, at 210, if the channel set list is not determined to be a null set the process moves to 220. At 220, device 116 scans the channel set that was sent by access point 102 on the channel in the restricted frequency band F1. Device 116 may perform active scanning by transmitting a probe on each of the channels in the set and wait for a response from one or more of the nearby access points. Each probe may include the SSID of the network. In an alternative implementation, depending on information sent with the channel set list and the configuration of the network, the device may not include any SSID, or may include a different SSID in one or more of the probes to certain access points. If a response is received on one of the scanned channels and a channel is found, device 116 switches to the channel in its unrestricted frequency band F2 or F3 at 226 and moves off of the channel in the restricted frequency band F1. For example, if device 116 had sent its most recent location as L2, the channel set list may have included a channel on frequency band F2 used by AP 106. In this case device 116 may switch to the channel on frequency band F2 from AP 106. In an alternative implementation of operation 220, device 116 may perform passive scans, or both passive and active scans, on the channels in the channel set. The passive scans may be used when the unrestricted channels being scanned include channels in the DFS frequency ranges because active scans are prohibited on DFS channels.

If, at 222, a response is not received on any of the scanned channels at 224, device 116 determines if a location update trigger has occurred. If it is determined that a location update trigger has not occurred, the process move to 220 and device 116 may rescan the channel set. Operations 220, 222 and 224 may be repeated over a predetermined time interval until a channel is found at 222 or an update trigger occurs at 224. If it is determined, at 224, that an update trigger has occurred, device 116 sends its updated device location to access point 102 at 218 and the process moves back to 208. In an example implementation, the location update trigger at 224 may be triggered on one or more of the criteria described in relation to the location update at 214 and 216.

In alternative implementations, if no channel is found at 222, device 116 may be configured to wait for a location update trigger instead of rescanning the channel set by repeating 220. Also, the timing of the channel set rescans by repeating 220, 222, and 224 may be set to reduce the amount of unnecessary scanning.

When the process has moved back to 208 from 218, device 116 will receive an updated channel set list, move to 210 and perform appropriate operations as the process is repeated, until a channel is found in the unrestricted frequency band F2 or F3, or device 116 leaves the network coverage area or is powered down.

Figure 3:
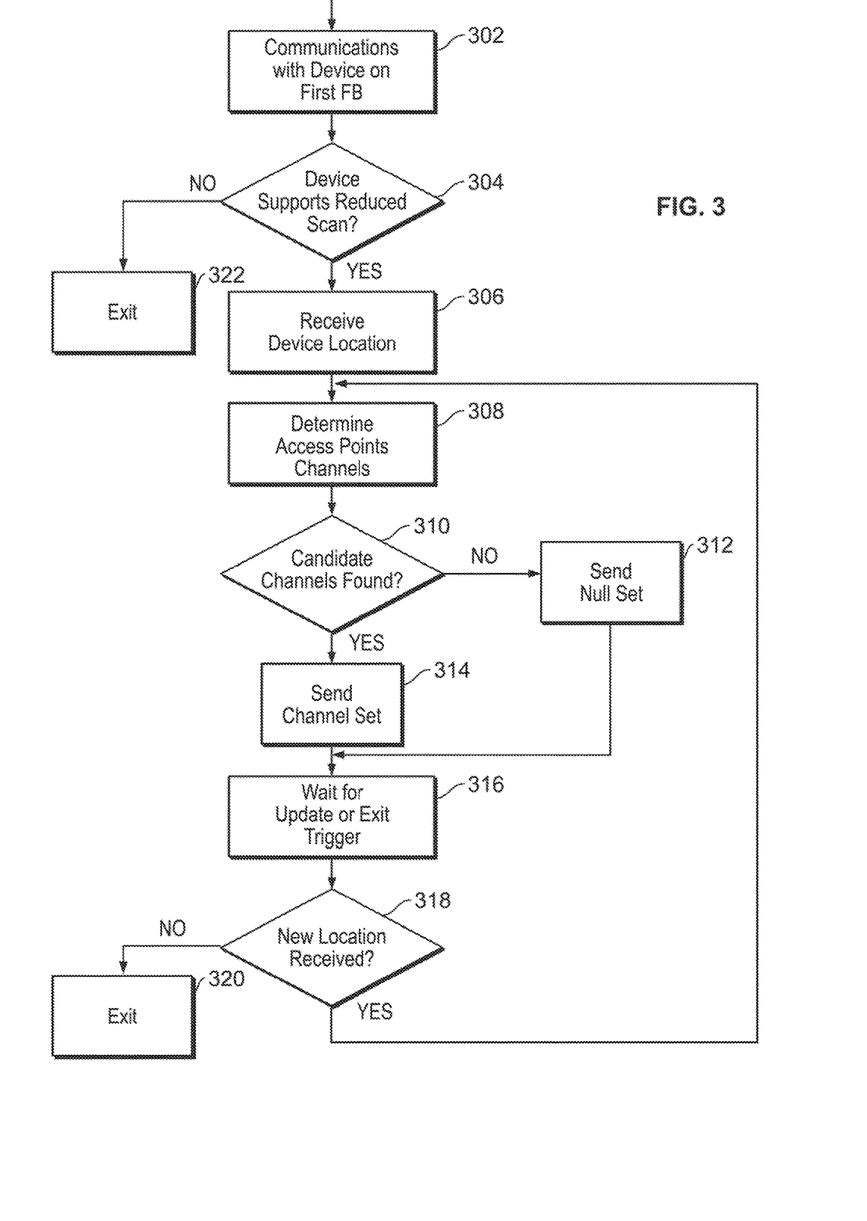
FIG. 3 is a flow diagram illustrating example operations in network infrastructure operable with the device in FIG. 2.

Referring now to FIG. 3, therein is a flow diagram illustrating example operations in network infrastructure operable with a device according to FIG. 2. FIG. 3 may be described with reference to access point 102 of FIGS. 1A and 1B, and FIG. 2. In alternative implementations, the operations of FIG. 3 may be performed in access point 102, in other infrastructure entities, or in a combination of access point 102 with other infrastructure.

At 302, access point 102 begins communications with device 116 on a channel in the restricted frequency band F1. This initiation of communications may happen when device 116 is located in the coverage area C1 that is non-overlapping with the coverage area C2 of access point 102 and the only available channels are channels in the restricted frequency band. For example, device 116 may be located at the position indicated by L1 in FIG. 1A when communications are first initiated on a channel of access point 102 in the restricted frequency band. The initiation of communication may be performed according to the air interface standard that access point 102 operates on in the restricted frequency band. In an example implementation the air interface may be according to the 802.11af standard.

At 304 the network determines if device 116 supports reduced scan. This may be performed by exchanging capability information between access point 102 and device 116 using information elements in the channel of the restricted frequency band F1. This determination may be made by the access point 102 or by another entity in the network 100. If it is determined that reduced set scanning is not supported by the device 116, the process exits at 322. If it is determined that device 116 supports reduced set scanning the process moves to 306. A channel set list is now determined based on information associated with the operation of the device 116 in the coverage area of restricted frequency band F1.

At 306 the initial location of device 116 is received by access point 102 from device 116. In an implementation, the location may be sent as a set of global positioning satellite (GPS) coordinates that are derived at the device 116, for example, at position L1.

At 308, appropriate access points and a set of channels in the unrestricted frequency band F2 of the access points are determined. In the example implementation, the channel set list is determined in network 100 based on the GPS location data of device 116. The network 100 may include a database that includes a list of network access points and associated location data. For each access point the database may also include a channel list of channels and frequency bands. The list of the set of channels may be obtained by determining which access points have a location that meets predetermined criteria in relation to the location sent by device 116 and then determining a list of unrestricted channels for those access points. The predetermined criteria may be, for example, a requirement that an access point be within a certain distance from the location of device 116. The predetermined distance may be based on, for example, the estimated or measured coverage area of an access point's channels in the unrestricted frequency band. For example, if device 116 sends location L1, the network 100 may determine that the device 116 is not near enough to any potential unrestricted frequency band coverage of any access point and determine, at 308, that no channel meets the criteria. If device 116 sends location L2, the network 100 may determine that the device 116 is near enough to potential coverage in the unrestricted frequency band of access points 106 and 108 and determine that the channel is a set of channels of the access points 106 and 108. If device 116 sends location L3, the network 100 may determine that the device 116 is near enough to potential coverage in the unrestricted frequency band by access point 110 and determine that the channel is a set of channels of the access point 110.

At 310 it is determined if candidate channels were found. If no candidate channels were found the process moves to 312. At 312 an indication of a null set is sent by access point 102 to device 116. The method then moves to 316 where the access point 102 waits for an updated location to be received from device 116 or an exit trigger. If, however, at 310 it is determined that candidate channels were found the set of channels is sent to device 116 at 314. The method then moves to 316 where the access point 102 waits for an updated location to be received from device 116 or an exit trigger. When an updated location is received from device 116 or an exit trigger occurs, the process moves to 318.

If it is determined at 318 that an updated location has been received, the process moves back to 308. At 308 appropriate access points and a set of channels in the unrestricted frequency band are determined based on the updated location. If it is determined at 318 that an exit trigger has occurred the process is exited at 320. The exit trigger may be, for example, the expiration of a timeout timer that occurs if no updated location is received from device 116 within a predetermined amount of time. The exit trigger may also be, for example, caused by the network receiving an indication that device 116 has switched frequency bands, powered down, or left the network 100.

Figure 4:
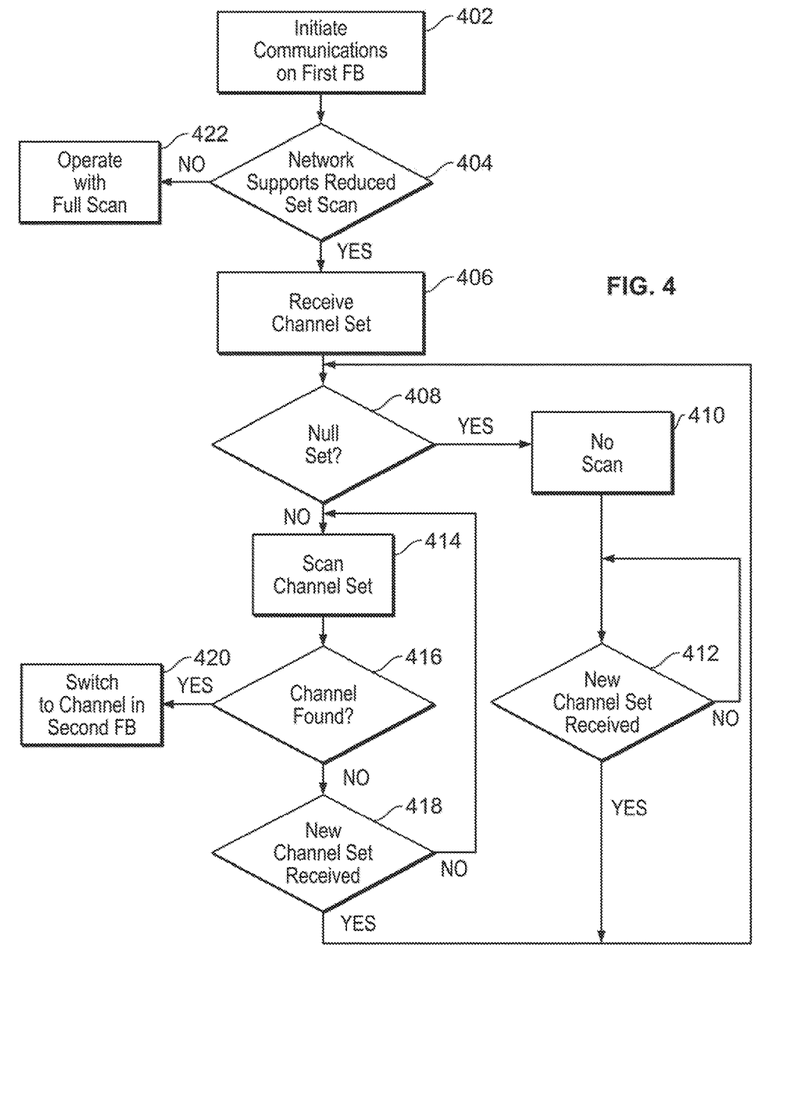
FIG. 4 is a flow diagram illustrating operations in performed in an example device according to another embodiment of the disclosure.

In other embodiments, a device 116 need not send its location to the network. In those embodiments the determination of a channel set in the unrestricted frequency band may be performed based on any other information associated with the operation of the device 116 in the first coverage area. Referring now to FIG. 4, therein is a flow diagram illustrating operations performed in an example device according to another embodiment of the disclosure. FIG. 4 may be explained with reference to FIGS. 1A and 1B and device 116. In an example implementation the restricted frequency band F1 channels may be configured according to the air interface in the licensed TVWS spectrum specified by the 802.11af standard. The unrestricted frequency band F2 and/or F3 channels may be configured according to the air interface specified by one or more of the 802.11 standards for the unlicensed 2.4 GHz and 5 GHz spectrums.

At 402, device 116 initiates communication with access point 102 of network 100 on the restricted frequency band F1. This initiation of communications may be performed when device 116 is located in the portion of coverage area C1 that is non-overlapping with the F2 and F3 band coverage areas of any other access points 102-112. In this example the only available channels located by device 116 are in the restricted frequency band F1 in coverage area C1. For example, device 116 may be located at the position indicated by L1 in FIG. 1A. The initiation of communication may be performed according to the air interface standard that access point 102 operates on in the restricted frequency band F1. In an example implementation the air interface may be according to the 802.11 af standard in the TVWS spectrum.

At 404 a determination is made at device 116 as to whether or not network 100 supports reduced set scanning. This may be performed by exchanging capability information between device 116 and access point 102 using information elements in the channel in the restricted frequency band. If it is determined that reduced set scanning is not supported the device 116 exits the process at 422 and operates using normal full scan procedures. If it is determined that the network supports reduced set scanning the process moves to 406.

At 406, device 116 receives a channel set list from access point 102. The channel set list may be received in an information element on the channel in the restricted frequency band F1. In the example implementation of FIG. 4, the channel set list may be produced by the network 100 first determining the location of device 116. For example, the network 100 may determine the location of device 116 based on the signal sent by device 116 in the restricted frequency band F1 and triangulation of the signal using three or more of the access points 102-110. This method of determining the location of device 116 may be used, for example, when a GPS signal is not available to determine the location of device 116. The channel set list may include channels on one or more unrestricted frequency bands depending on the configuration of access points in a network. For example, in the implementation of FIG. 1A the channel set list may include only channels of unrestricted frequency band F2 or may include channels for both unrestricted frequency bands F2 and F3. The inclusion of channels in the channel set list depends on which unrestricted channels are determined by the network to be best suited for potential use by device 116 based on its location relative to each of the network access points 102-112.

At 408, device 116 determines whether the channel set list is a null set. If the channel set list does not include any channel, and a null list or a null set indication has been received, the process moves to 410 and no channel scan is performed by device 116. Use of the null set indication allows device 116 to avoid unnecessary scanning when the network 100 has determined that device 116 at location L1 is too far out of range to practically find acceptable network channels in frequency bands F2 or F3. From 410 the process moves to 412 where the device 116 waits for new channel set to be received from AP 102. When a new channel set list is received at 412 device 116 moves back to 408 and repeats the process from 408

However, if the channel set list is not determined to be a null set at 408, the process moves to 414. At 414, device 116 scans the channel set sent by access point 102 on the channel in the restricted frequency band F1. Device 116 may perform active scanning by transmitting a probe on each of the channels in the channel set and wait for a response from one or more of the nearby access points. Each probe may include the SSID of the network. In an alternative implementation, depending on information sent with the channel set list and the configuration of the network, the device 116 may not include any SSID, or may include a different SSID in one or more of the probes to certain access points. At 416 it is determined if a response is received on one of the scanned channels and a channel is found. If a channels is found, at 420, device 116 switches to the found channel in the unrestricted frequency band F2 or F3 and moves off of the channel in the restricted frequency band F1 to complete the process. In one alternative implementation, each channel in the channel set list may be received from the network 100 along with an assigned channel priority for scanning. In this implementation, the device will scan the channel set in the order indicated by the priority. Also, in another alternative implementation of operation 414, device 116 may perform passive scans, or both passive and active scans, on the channels in the channel set. The passive scans may be used when the channels being scanned include channels in the DFS frequency ranges.

If, however, a response is not received on any of the scanned channels and a channel is not found, the process moves to 418 where the device 116 waits for a new channel set to be received from AP 102. If a new channel set list has not been received from device 116 within a predetermined time the process may move back to 414 and repeat the scan of the current channel set. When a new channel set list is received at 418, device 116 moves back to 408 and repeats the process from 408. The timing of the channel set rescans by repeating 414, 416, and 418 may be set to reduce the amount of unnecessary scanning. Also, the determination operations of 412 and 418 may be timed out after a predetermined time if no new channel set is received from the network 100 within that time, and the process may be exited.

Figure 5:
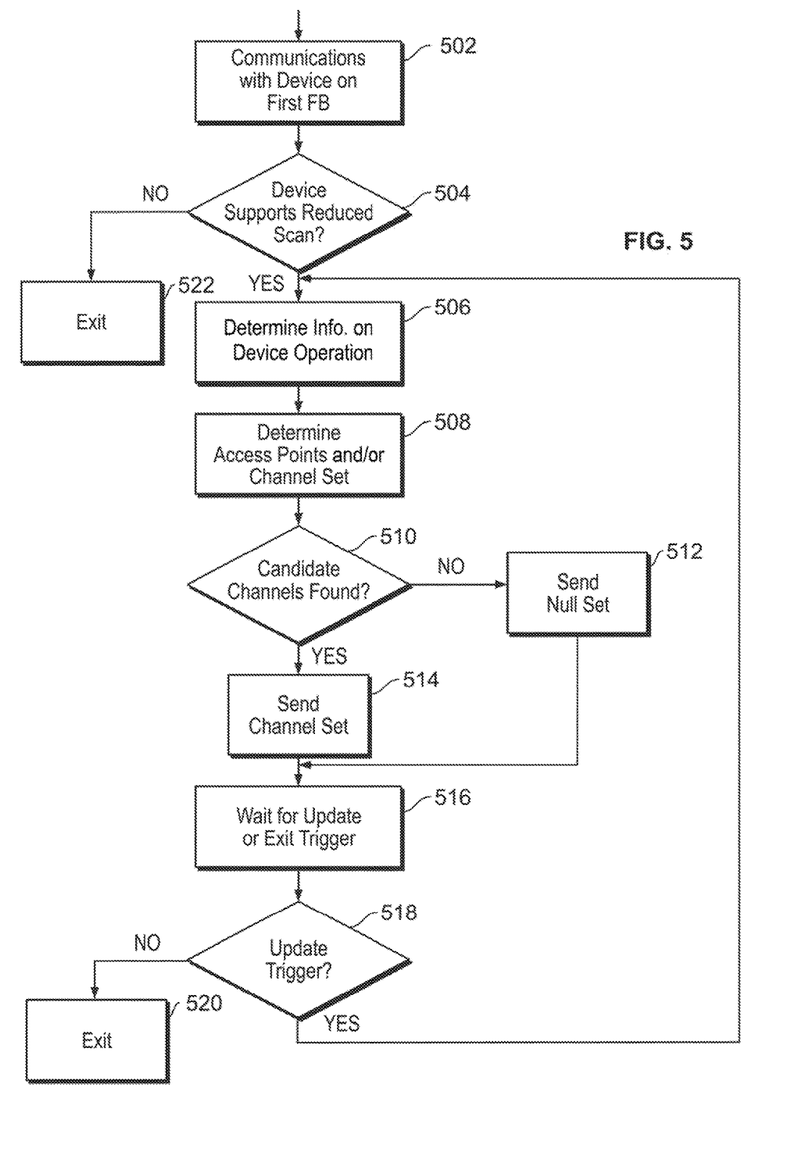
FIG. 5 is a flow diagram illustrating example operations in network infrastructure operable with the device in FIG. 4.

Referring now to FIG. 5, therein is a flow diagram illustrating example operations in network infrastructure operable with the device of FIG. 4. FIG. 5 may be described with reference to FIGS. 1A and 1B, and FIG. 4. In alternative implementations, the operations of FIG. 5 may be performed in access point 102, in other infrastructure entities, or in a combination of access point 102 with other infrastructure entities.

At 502, access point 102 begins communications with device 116 on a channel in the restricted frequency band F1. This initiation of communications may take place when device 116 is located in the coverage area C1 that is non-overlapping with the coverages areas C2 and C3 of access point 102, or the coverage area of any other AP in network 100. In this situation the only available channels located by device 116 are channels of access point 102 in the restricted frequency band. For example, device 116 may be located at the position indicated by L1 in FIG. 1A when communications are first initiated on a channel of access point 102 in the restricted frequency band. The initiation of communication may be performed according to the air interface standard that access point 102 operates on in the restricted frequency band. In an example implementation the air interface may be according to the 802.11af standard in the TVWS frequency spectrum.

At 504 the network determines if device 116 supports reduced scan. This may be performed by exchanging capability information between access point 102 and device 116 using information elements in the channel of the restricted frequency band F1. This determination may be made in the access point or by another entity in the network. If it is determined that reduced set scanning is not supported by the device, the process exits at 522. If it is determined that device 116 supports reduced set scanning the process moves to 506. A channel set list is now determined based on information associated with the operation of the device in the coverage area of restricted frequency band F1.

At 506, information associated with the operation of device 116 in the coverage area of the restricted frequency band is determined. In one embodiment, the initial location of device 116 is determined based on information associated with the operation of the device 116. In an example implementation, the network 100 may determine the location of device 116 based on the signal sent by device 116 as it communicates with AP 102 in the restricted F1 frequency band. This signal sent by device 116 may be triangulated using three or more of the access points 102-110, or other APs in network 100, that have the capability to receive and measure the signal in the restricted F1 frequency band. The information associated with the operation of device 116 may also be indicated by a list of channels of APs in the network 100 at which the signal sent by device 116 in the restricted frequency band is received at or above a predetermined power level. In another implementation, the location of device 116 may be a coarser location based on the fact that the device 116 is operating on a restricted band channel of AP 102 and indicating a coarse location of device 116 in network 100 in the area of AP 102. In other alternatives, directional aspects of antennas may be utilized for location determination. Any other method of determining a location or potential unrestricted band channels for device 116 at 506 may also be utilized in other implementations of FIG. 5. Generally, the more accurate the location determination, the more reduction in the amount of scanning that can be realized because a smaller channel set list may result from using a more accurate location.

At 508, appropriate access points and a set of channels in the unrestricted frequency band F2 of the access points are determined. The channel set list may include channels on one or more unrestricted frequency bands depending on the configuration of access points in a network. For example, in the implementation of FIG. 1A the channel set list may include only channels of unrestricted frequency band F2 or may include channels for both unrestricted frequency bands F2 and F3. The inclusion of channels in the channel set list depends on which unrestricted channels are determined by the network 100 to be best suited for potential use by device 116 based on its location relative to each of the network access points 102-112. In an example implementation, the channel set list is determined in network 100 based on the location of device 116 as determined by the network 100 at 506. The network 100 may include a database that includes a list of network access points and associated location data. For each access point the database may also include a channel list of channels and frequency bands.

The list of the set of unrestricted channels may be obtained by determining which access points have a location that meets predetermined criteria in relation to the location determined at 506 and then obtaining a list of channels for those access points. The predetermined criteria may be, for example, a requirement that an access point be within a certain distance from the location of device 116. The predetermined distance may be based on, for example, the estimated or measured coverage area of an access point's channels in the unrestricted frequency band. For example, if the network 100 determines device 116 is at location L1 by triangulation, the network 100 may determine that the device 116 is not near enough to any potential coverage of any access point and determine, at 508, that no channels meet the criteria. If network 100 determines device 116 is at L2 by triangulation, the network 100 may determine that the device 116 is near enough to potential coverage in the unrestricted frequency band of access points 104, 106 and 108 and determine that the channel is a set of channels of the access points, 104, 106 and 108. If network 100 determines device 116 is at L3, the network 100 may determine that the device 116 is near enough to potential coverage in the unrestricted frequency band by access point 110 and obtain a set of channels of the access point 110.

In another implementation, for example, when the location determined by the network at 506 is indicated by a list of other APs that receive the signal sent by device 116 in the restricted frequency band at or above a predetermine power level, unrestricted band channels of those access points will be the channels in the channel set. In another alternative, when the location of device 116 is a coarser location based on the fact that the device 116 is operating on a restricted band channel of AP 102, channels of the neighbor APs of AP 102 will be the channels in the channel set.

In another implementation, the power levels of the TVWS signal as measured at APs in network 100 also may be utilized in configuring the channel set list. The APs at which the power level is measured may include the APs that performed triangulation to determine the location of device 116. For example, the received power level of the device's TVWS signal at the APs may be used to prioritize the channels in the channel set list in a scanning order so that channels from the APs that received the TVWS signal at higher power levels are assigned a higher priority for scanning by device 116.

At 510 it is determined if candidate channels were found. If no candidate channels were found the process moves to 512. At 512 an indication of a null set is sent by access point 102 to device 116. The network then moves to 516 where it waits for an update indication or an exit trigger. If, however, at 510 it is determined that candidate channels were found the set of channels is sent to device 116 at 514 on the channel in the restricted frequency band. If the channels were prioritized for scanning, the priority information for each channel is also sent with the channel set. The network then moves to 516 where it waits for an update indication or an exit trigger. When an update indication or an exit trigger occurs, the process moves to 518.

If it is determined at 518 that an update indication has occurred, the process moves back to 506. At 506 the network 100 determines an updated location for device 116. At 508 appropriate access points and a set of channels in the unrestricted frequency band are determined based on the updated location. If, however, it is determined at 518 that an exit trigger has occurred the process is exited at 520. The update indication may be, for example, the expiration of a timer that occurs after predetermined time. The predetermined time may be set to efficiently track movement of device 116. The exit trigger may be, for example, caused by the network 100 receiving an indication that device 116 has switched frequency bands or has left the coverage area of network 100.

Figure 6:
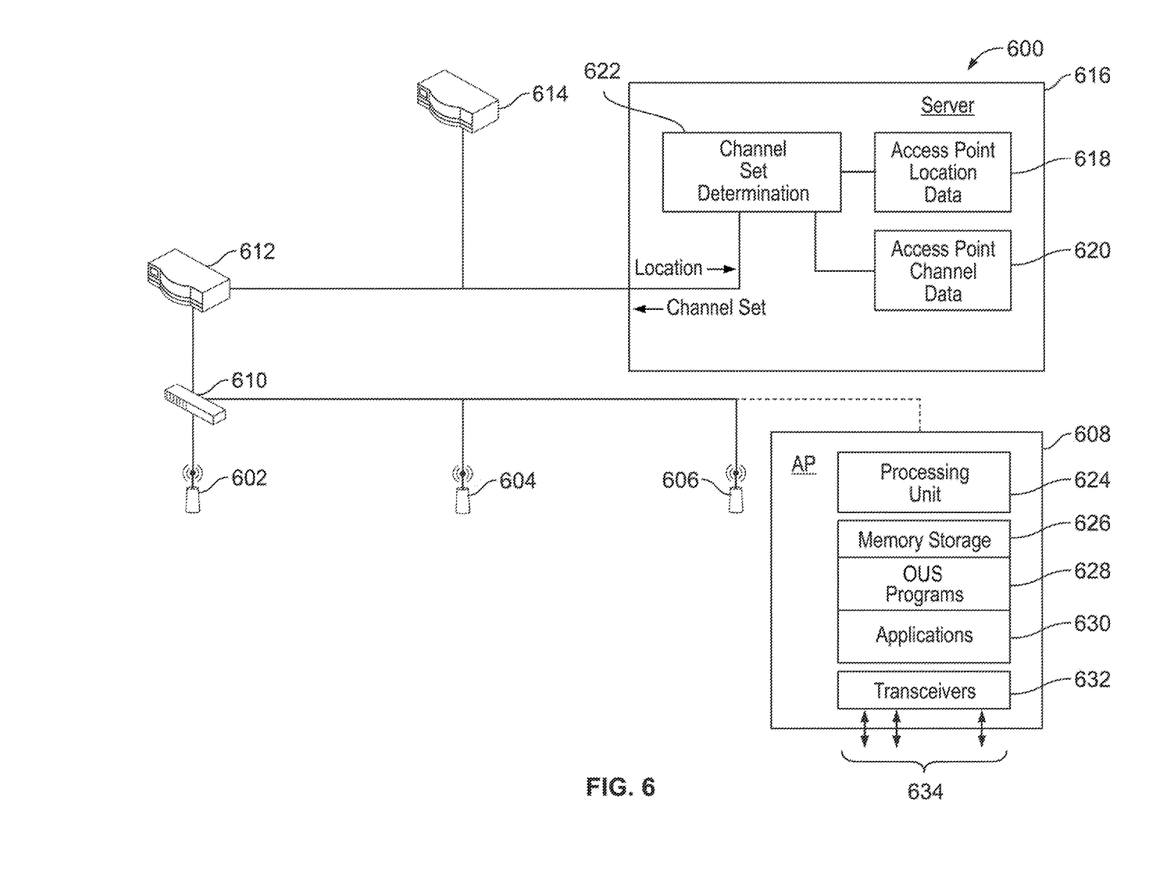
FIG. 6 is a simplified block diagram of an example implementation of network infrastructure.

Referring now to FIG. 6, therein is a simplified block diagram of an example implementation of network infrastructure according to an embodiment of the disclosure. FIG. 6 shows an example network 600 which may be implemented as a portion of network 100 of FIG. 1A. Network 600 includes router 612, access point/gateway 614, server 616, switch 610, and access points (APs) 602, 604, 606, and 608. Router 612, access point/gateway 614, server 616 and switch 610 may be configured to provide traffic routing and switching functions for traffic to and from the APs 602, 604, 606, and 608 over the infrastructure to a backend network. Network 600 may be a private business network, a commercial/retail establishment network, or any other type of wireless network. AP 608 and server 616 are shown as functional block diagrams illustrating features and functions included in network 600 according example implementations. AP 608 may be representative of the other access points in network 600.

Server 616 includes Channel Set Determination Function 622, Access Point Location Data 618, and Access Point Channel Data 620. Channel Set Determination Function 622 may be utilized in the embodiments, for example at 308 and 508 of FIGS. 3 and 5. Channel Set Determination Function may receive a device location that was received from the device at 306 or determined by the network at 506. Channel Set Determination Function 622 accesses Access Point Location Data 618 to determine which access points have a location within a predetermined location of the device location. In other implementations, Channel Set Determination Function 622 may receive other types of information associated with the operation of a device, such as a received power level of a device's signal in the restricted frequency band as measured at network access points. Channel Set Determination Function 622 may then determine access points based on the received power level information. Channel Set Determination Function 622 then retrieves channel data 620 based on the determined access points. Channel Set Determination Function 622 may then create a channel set based on channels of the determined access points that are in the unrestricted frequency bands. Channel Set Determination Function 622 then may send the channel set to an appropriate access point such as AP 608 to initiate sending of the channel set to the device over the channel in the restricted frequency band. In one implementation, Channel Set Determination Function 622 may also include SSID information with the channel set if the network configuration is such that access points with channels on the list are associated with different SSIDs.

AP 608 includes processing unit 624, transceivers 632, and memory/storage 626 that includes code and instructions for implementing Opportunistic Use of Spectrum (OUS) functions that perform the operations of FIG. 3 or 5, in conjunction with server 616. Memory 626 may be implemented as any type of computer readable storage media, including non-volatile and volatile memory. AP 608 connects to network over interfaces to switch 610. Processing unit 624 may comprise one or more processors, or other control circuitry or any combination of processors and control circuitry that provide overall control of the access point according to the disclosed embodiments. Transceivers 632 provide the capability for access point 608 to communicate with devices, such as device 116 in the restricted and unrestricted frequency bands. Transceivers 632 also provide the capability to measure channel signals in the restricted frequency bands and provide measurements for use by the server 616 Channel Determination function 622. In one implementation of a network, the operations described as performed by server 616 in relation to FIG. 6A may be performed in a network by one or more APs such as AP 608.

In a further embodiment of the disclosure, AP 608 may be configured to operate in a network in which DFS spectrum in the 5 GHz UNII-2 frequency bands is opportunistically used and treated as restricted spectrum by the network. In this embodiment AP 608 may be configured to allow passive scanning on a reduced set of DFS channels to minimize the amount of scanning done by devices in the network. AP 608 may send a beacon signal on a channel in an unrestricted network frequency band that includes an IE indicating a reduced DFS channel set comprising a subset of the plurality of DFS channels of the network. The subset may be the subset of DFS channels of APs within a predetermined distance of, or proximate to, the AP 608. The unrestricted frequency bands may be channels in the 2.4 GHz ISM and 5 GHz UNII-1 frequency bands. The sending of the subset in the beacon may be initiated when the network or AP 608 determines that unrestricted channels of the network are overloaded and it is desired to balance channel load in the network. The sending of the subset allows a device to determine the subset from the received beacon signal. The device may then initiate a passive scan on the restricted DFS frequency band channels in the subset, rather than performing a passive scan for each channel of larger set of network DFS channels.

Figure 7A:
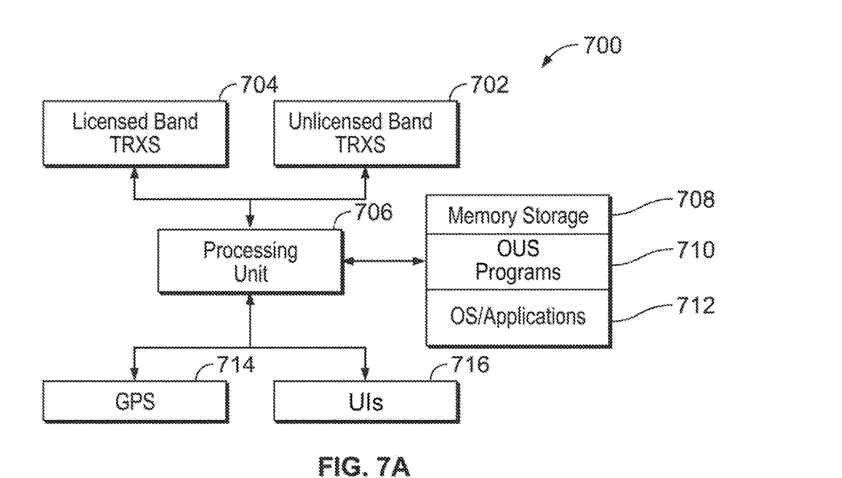
FIG. 7A is a simplified block diagram of an example implementation of a device; and, FIG. 7B is a simplified block diagram of an example implementation of server.

Referring now to FIG. 7A, therein is a simplified block diagram of an example implementation of a device. Device 700 represents a possible implementation of device 116, or any other device that may operate in network 100. Device 700 may include user interfaces (UIs) 716 that may include, for example, a touch screen or keypad, a microphone, speakers, or camera which receive inputs and provide outputs to and from device 700. Device 700 also may include global positioning satellite (GPS) function 714 that receives signals from a satellite system for use in determining a location of device 700. GPS 714 may be used to provide the device location to a network for use in channel set determination according to embodiments of the disclosure. Device 700 includes processing unit 706 and memory/ storage 708 which is shown as including program code or instructions for Opportunistic Use of Spectrum (OUS) programs 710 for implementing reduced channel set scan. In an example implementation of device 700, OUS programs 710, when executed, cause the processing unit 706 to control device 700 to perform operations as shown in the embodiments of FIGS. 2 and 4. Memory 708 also includes code or instructions for the device operating system (OS) and other device applications 712.

Memory 708 may be implemented as any type of computer readable storage media in device 700, including non-volatile and volatile memory. Memory 708 also may include data such as media data, camera photos and videos, contact data, calendar data, and other files used in the operation of applications on device 700. Processing unit 706 may comprise one or more processors, or other control circuitry or any combination of processors and control circuitry. Processing unit 706 provides overall control of device 700 and the other functional blocks shown in FIG. 7A by implementing instructions and code in memory 708 to provide necessary functions for operation in network 100.

Device 700 includes transceivers (TRXs) operating in different frequency bands as shown by licensed band TRXS 704 and unlicensed band TRXS 702. In an implementation, licensed band TRXS 704 401 may include one or more transceivers that operate in licensed (restricted) TVWS band and TRXS 702 may include one or more transceivers operating in the unlicensed (unrestricted) 2.4 GHz ISM and 5 GHz UNII Bands. In the embodiments, device 700 and its transceivers may be operable to use one or more spectrum allocations that are allowed in each of the designated frequency bands according to the relevant IEEE 802.11 standard specifications supported by the network with which it communicates. The functions shown in FIG. 7A may also be implemented in a device having cellular capabilities in addition to the illustrated functions.

In a further embodiment of the disclosure, device 700 may be configured to operate in a network in which DFS spectrum in the 5 GHz UNII-2 frequency bands is opportunistically used and treated as restricted spectrum by the network. In this embodiment device 700 may perform passive scanning on a reduced set of DFS channels to minimize the amount of scanning done. The scanning may be done when unrestricted network channels, such as channels in the 2.4 GHz ISM and 5 GHz UNII-1 frequency bands, are overloaded and it is desired to balance channel load in the network. Device 700 may receive a beacon signal from an AP on a channel of an unrestricted frequency band that includes an IE indicating a reduced DFS channel set comprising a subset of the plurality of DFS channels of the network. The subset may be configured by the network or the AP sending the beacon signal and may be the subset of DFS channels of APs within a predetermined distance of, or proximate to, the sending AP. Device 700 may determine the subset from the received beacon signal and initiate a passive scan in the restricted DFS frequency band channels in the subset rather than performing a passive scan for each channel of larger set of network DFS channels.

Figure 7B:
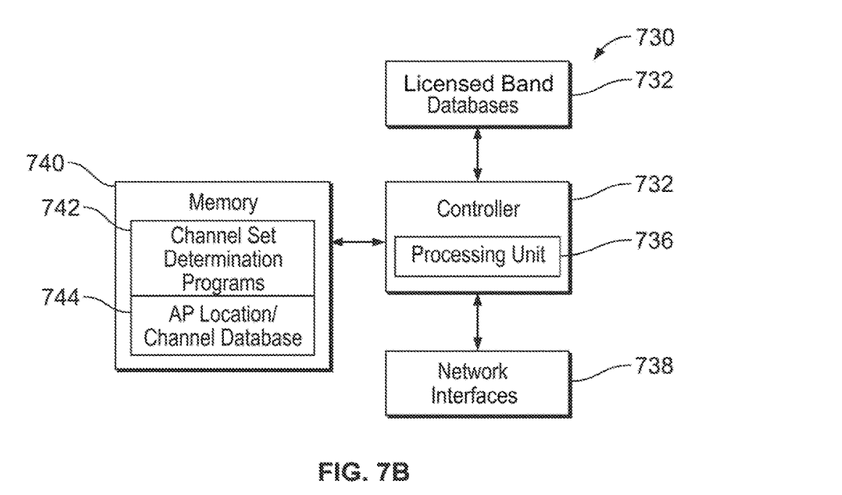

Referring now to FIG. 7B therein is a simplified block diagram of an example server 700 according to which server 616 of FIG. 6 may be implemented. Server 700 includes controller 732 having processing unit 736, memory 740, network interfaces 738, and licensed band database 746. Licensed band database 746 may include, for example, a TVWS spectrum database that is updated as required by local regulations with current data on available TVWS spectrum from an appropriate geo-location spectrum database (GSDB). The TVWS data may be utilized by network 600 so that it operates on currently permitted TVWS channels. Memory 740 may be implemented as any type of computer readable storage media, including non-volatile and volatile memory. Memory 740 includes channel set determination programs 742 and AP location/channel database 744 that may be utilized in operations 306 and 506, respectively, of FIGS. 3 and 5. Controller 732 and processing unit 736 may comprise one or more processors, or other control circuitry, or any combination of processors and control circuitry that provide overall control of server 700 according to the disclosed embodiments. Server 700 is shown as a single server but may be representative of server functions or server systems provided by one or more servers or computing devices that may be co-located or geographically dispersed. When implemented as server 616 in network 600, server 700 may be located in the infrastructure of network 600 or remotely from network 600. The term server as used in this disclosure is used generally to include any computing devices or communications equipment that may be implemented to perform the functions and processes of the embodiments.

The example embodiments disclosed herein may be described in the general context of processor-executable code or instructions stored on memory that may comprise one or more computer readable storage media (e.g., tangible non-transitory computer-readable storage media such as memory 626, 740 or 708). As should be readily understood, the terms "computer-readable storage media" or "non-transitory computer-readable media" include the media for storing of data, code and program instructions, such as memory 626, 740 or 708, and do not include portions of the media for storing transitory propagated or modulated data communication signals The embodiments of the disclosure include an apparatus in a wireless local area network comprising at least one processor and memory. The memory includes code that is executable to cause the at least one processor to control the network to communicate with a device to initiate communications over a channel of a restricted frequency band having a first coverage area, determine a channel set list comprising a subset of a plurality of channels of a unrestricted frequency band having a second coverage area including at least a portion overlapping the first coverage area, wherein the channel set list is determined based on information associated with the operation of the device in the first coverage area, and send the channel set list to the device over the channel in the restricted frequency band. The information associated with the operation of the device may include a location of the device and the channel set list may comprise a set of channels of at least one network access point that meet a predetermined criteria based on the location of the device. The apparatus may determine the set of channels by querying a database using the location of the device. The network may receive the location of the device from the device on the channel of the restricted frequency band. The location of the device may include GPS information derived at the device. The restricted frequency band may comprise TVWS spectrum. Also, the restricted frequency band may comprise DFS spectrum. Additionally, the at least one processor may control the network to send the channel set list by sending a null set indication.

Embodiments of the disclosure also include device operable to communicate with a wireless local area network on a channel of a restricted frequency band having a first coverage area and on a channel of a plurality of channels of an unrestricted frequency band having a second coverage area including at least a portion overlapping the first coverage area. The device comprises at least one processor and memory. The memory includes code that is executable to cause the at least one processor to control the device to initiate communications with the network on the channel of the restricted frequency band, receive a channel set list on the channel of the restricted frequency band, the channel set list comprising a subset of the plurality of channels of the unrestricted frequency band, wherein the channel set list is determined based on information on the operation of the device in the first coverage area, scan the channels in the channel set list of the unrestricted frequency band, and switch the communication with the network to a selected channel in the channel set list if the selected channel is found to be acceptable in the scan. The device may send location information derived at the device to the network and the received channel set list may include information determined based on the location information. The restricted frequency band may comprise TVWS spectrum. The device may switch the communications with the network to a selected channel in the channel set list while in the at least a portion of the second coverage area overlapping the first coverage area. The device may scan the channels of the channel set list using an active scan. The device may receive a first channel list that is null and, in response, wait until a second channel set list that includes at least one channel is received before it scans.

Other embodiments include a device operable in a wireless local area network, the device comprising at least one processing unit and memory. The memory includes code executable to cause the at least one processing unit to control the device to receive a beacon signal from an access point on a channel of an unrestricted frequency band, determine a reduced channel set comprising a subset of a plurality of channels of the network in a restricted frequency band from the received beacon signal, and initiate a passive scan, in the restricted frequency band, of channels of the reduced channel set determined from the beacon signal. The restricted frequency band may comprise dynamic frequency switching spectrum in the 5 GHz UNII-2 band. The unrestricted frequency band may comprise spectrum in the 2.4 GHz ISM band and the 5 GHz UNII-1 band.

While embodiments have been disclosed as having functions implemented on access points, servers and/or devices operating in a network, one or more of the functions may be implemented on different types of equipment. For example, one or more of the functions in the system shown as implemented on a server located in network infrastructure may be implemented on a device, such as mobile device, laptop computer or any other suitable device operating in a network.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus comprising:
   a processor; and
   a memory in communication with the processor, the memory comprising executable instructions that, when executed by the processor, cause the processor to control the apparatus to perform functions of:
   receiving a location of a device via a channel of a restricted frequency band in a network, wherein a limited use of the restricted frequency band is permitted to minimize interference with a licensed user of the restricted frequency band;
   determining a channel set based on the location of the device, the channel set comprising one or more channels of a plurality of channels of an unrestricted frequency band in the network; and
   initiating sending of the channel set to the device via the channel of the restricted frequency band.

2. The apparatus of claim 1, wherein the channel set is determined based on a received power level of a signal received from the device via the channel of the restricted frequency band.

3. The apparatus of claim 1, wherein the location of the device is received in a signal associated with an operation of the device on the channel of the restricted frequency band.

4. The apparatus of claim 3, wherein the location of the device includes Global Positioning Satellite information derived at the device.

5. The apparatus of claim 1, wherein the restricted frequency band comprises Television White Space Spectrum.

6. The apparatus of claim 1, wherein the restricted frequency band comprises Dynamic Frequency Switching spectrum.

7. The apparatus of claim 1, wherein the unrestricted frequency band comprises spectrum in the 2.4 GHz Industrial Services and Medical and the 5 GHz Unlicensed National Information Infrastructure bands.

8. The apparatus of claim 1, wherein the channel set is sent as a null set to the device.

9. The apparatus of claim 1, wherein the one or more channels are prioritized based on a power level of a signal received from the device by one or more access points of the network, the one or more access points operating on the plurality of channels of the unrestricted frequency band in the network.

10. A device comprising:
a processor; and
a memory in communication with the processor, the memory comprising executable instructions that, when executed by the processor, cause the processor to control the device to perform functions of:
determining a location of the device;
sending the determined location of the device to an access point of a network via a channel of a restricted frequency band in the network, wherein a limited use of the restricted frequency band is permitted to minimize interference with a licensed user of the restricted frequency band;
receiving a channel set from the access point via the channel of the restricted frequency band, the channel set comprising one or more channels of a plurality of channels of an unrestricted frequency band in the network;
scanning the one or more channels of the received channel set of the unrestricted frequency to select one of the one or more channels; and
initiating communication with the network via the selected channel if the selected channel is found to be acceptable in the scan.

11. The device of claim 10, wherein the received channel set is determined based on the location of the device.

12. The device of claim 10, wherein the restricted frequency band comprises Television White Space spectrum.

13. The device of claim 10, wherein the channel of the restricted frequency band has a first coverage area, the plurality of channels of the unrestricted frequency band have a second coverage area, at least a portion of the second coverage area overlapping the first coverage area.

14. The device of claim 10, wherein the channel set comprises a first channel set received from the access point as a null set, and
wherein the instructions further include instructions that, when executed by the processor, cause the processor to control the device to perform functions of, in response to the received first channel set, waiting until a second channel set that includes at least one channel is received before scanning the one or more channels in the channel set of the unrestricted frequency band.

15. The device of claim 10, wherein the instructions further include instructions that, when executed by the processor, cause the processor to control the device to perform functions of:
sending an updated location of the device when the device moves in the network; and
receiving a channel set comprising one or more channels of the plurality of channels of the unrestricted frequency band determined based on the updated location of the device.

16. The device of claim 10, wherein the one or more channels are prioritized based on a power level of a signal sent from the device to one or more access points of the network, the one or more access points operating on the plurality of channels of the unrestricted frequency band in the network.

17. A method of operating first and second devices, the method comprising:
determining, at the first device, a location of the first device;
sending the location of the first device from the first device to the second device via a channel of a restricted frequency band in a network, wherein a limited use of the restricted frequency band is permitted to minimize interference with a licensed user of the restricted frequency band;
determining, at the second device, a channel set based on the location of the first device, the channel set comprising one or more channels of a plurality of channels of an unrestricted frequency band in the network; and
sending the channel set from the second device to the first device via the channel of the restricted frequency band in the network.

18. The method of claim 17, further comprising:
scanning, at the first device, the one or more channels of the channel set to select one of the one or more channels of the unrestricted frequency band in the network; and
initiating, at the first device, communication with the network via the selected channel of the unrestricted frequency.

19. The method of claim 18, wherein the one or more channels are prioritized based on a power level of a signal received from the first device by one or more access points of the network, the one or more access points operating on the plurality of channels of the network in the unrestricted frequency band in the network.

* * * * *